June 29, 1965  R. M. HUTCHINSON  3,191,442
APPARATUS FOR WEIGHING
Filed July 12, 1963

INVENTOR.
ROBERT M. HUTCHINSON
BY
ATTORNEY.

3,191,442
APPARATUS FOR WEIGHING
Robert M. Hutchinson, Havertown, Pa., assignor to Honeywell Inc., a corporation of Delaware
Filed July 12, 1963, Ser. No. 294,699
6 Claims. (Cl. 73—432)

The present invention relates to automatic weighers.

More specifically, the present invention relates to automatic computing weighers.

An object of the present invention is to provide a novel automatic computing weigher.

Another object of the present invention is to provide a novel automatic weigher for accurately weighing objects in a moving environment.

Still another object of the present invention is to provide a novel automatic weigher wherein the cancellation of extraneous effect arising from uncontrolled environmental forces is achieved.

A further object of the present invention is to provide a novel automatic weigher using a computer for deriving an accurate and rapid weight of an object with a simplicity of operation and construction.

Still another further object of the present invention is to provide a novel compact automatic weigher for weighing objects without impeding a desired motion of the weighed object.

In accomplishing these and other objects, there has been provided, in accordance with the present invention, an automatic weigher having a movable plate for supporting an object to be weighed. The plate is accelerated by a motor and cam means with a load cell being arranged to measure the accelerating force applied to the plate while an accelerometer is measuring the acceleration imparted to movable plate and object. A computer is used to compute the mass of the object from the derived force and acceleration signals to control related equipment.

A better understanding of the present invention may be had from the following detailed description when read in connection with the accompanying drawings, in which.

Figure 1:
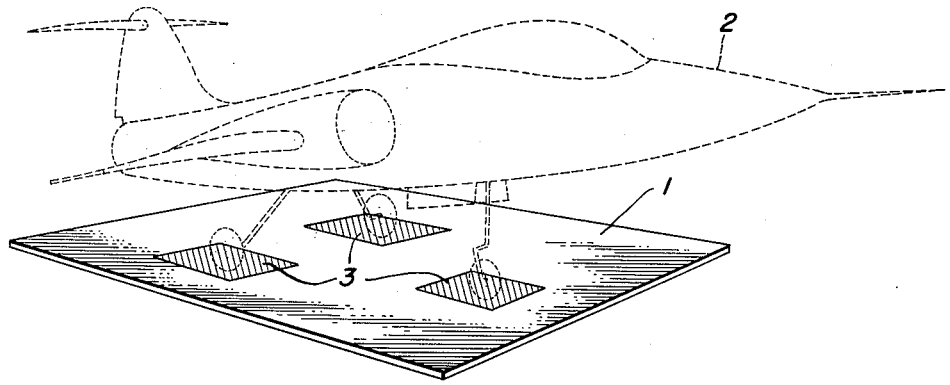
FIG. 1 is a pictorial representation of an automatic weighing apparatus embodying the present invention.

Referring to FIG. 1 in more detail, there is shown a movable weighing platform 1 for supporting the object to be weighed. The plate 1 is preferably made of steel, or a similar high strength material, to allow the objects to be weighed to be placed thereon without distortion of the plate 1. As shown in FIG. 1, such objects may comprise an airplane which is driven onto the plate 1. In such an application, the plate 1 may be part of the deck of an aircraft carrier. In order to launch airplanes from such a carrier, a steam-driven catapult is used to propel the airplane to an adequate velocity for take-off. The proper use of such a catapult requires that the steam admitted to the mechanism is adequate to propel the plane while preventing a waste of steam through the use of unnecessary quantities. Accordingly, it is necessary to know the actual weight of the airplane being launched. In the use of the present invention, a plane 2 would be driven onto the plate 1 prior to being launched. A plurality of high friction surfaces 3 are provided on the surface of the plate 1 to provide means for temporarily gripping the plane 2 without impeding the travel of the airplane on and off the plate 1.

Figure 2:
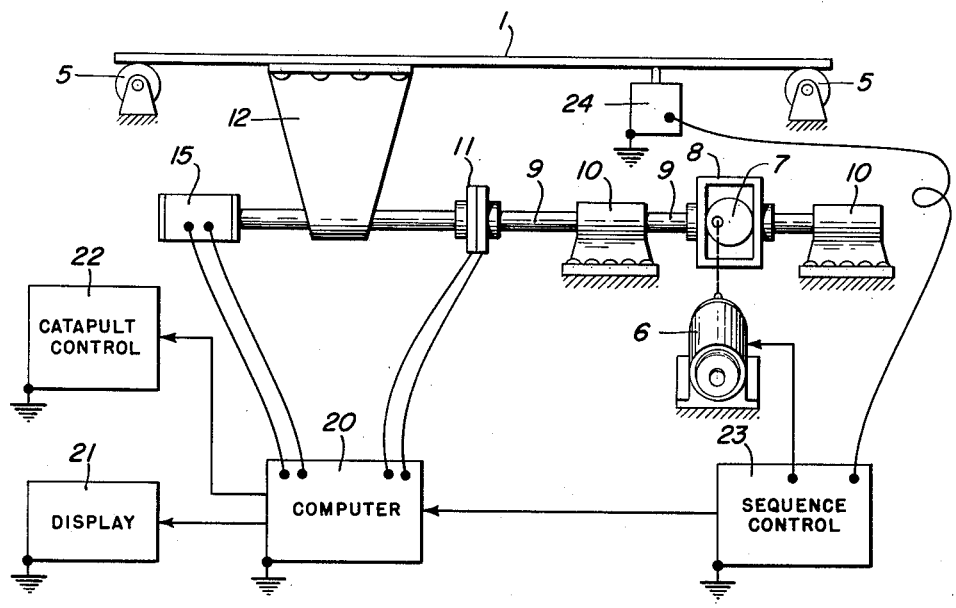
FIG. 2 is a pictorial representation of a side view of the weighing apparatus shown in FIG. 1 and including a block diagram of the weight computing circuitry.

As shown in FIG. 2, the plate 1 is movably supported on a plurality of rollers 5 to allow a longitudinal movement of the plate 1. A motor 6 is arranged to drive a cam element 7 within a cage 8 to impart a back and forth motion of the cage 8. The cage 8 is fastened to a shaft 9 supported in a plurality of bearing members 10. The bearing members 10 are arranged to allow the aforesaid motion of the cage 8 to produce a corresponding motion of the shaft 9.

A load cell 11 is mounted on the end of the shaft 9 as a force transferring element to measure the force being applied to the shaft 9. The load cell 11 is fastened to a plate driver 12 which driver is fixedly attached to the plate 1. An accelerometer 15 is also fastened to the driver 12 to measure the acceleration of the driver 12 which is the acceleration of the plate 1. The movement of the shaft 9 by the cam 7 is arranged to be a small motion whereby the plane 2 is retained in a static position with respect to the plate 1 by the surfaces 3. Accordingly, the acceleration of the plate 1 is effective to also accelerate the plane 2 by the same amount. The output signals from the load cell 11 and the accelerometer 15 are applied to a computer 20.

The computer 20 is arranged to solve the equation $$M=F/A$$

where:

$M$=Mass accelerated
$F$=Accelerating force
$A$=Measured acceleration using conventional computing techniques. The output of the computer 20, accordingly, is arranged to be the weight, or inertial mass, of the airplane after the constant weight of the other components are subtracted therefrom. Further, in order to eliminate the effect of wind drag on the airplane 2 and aerodynamic lift stemming from the lifting surfaces of the airplane 2, the plate 1 is accelerated in a fore and aft direction, with respect to the airplane, by the cam 7. Using the two sets of input signals, the computer 20 is arranged to eliminate the lift error to provide a true reading of airplane mass. It may be seen that the computed weight is also free from the effects of the uncontrolled movements of the aircraft carrier environment inasmuch as the computer input signals are dependent on the induced effect of the motor 6. The output of the computer 20 is applied to display device 21 to provide a visual indication of the airplane weight. Additionally, the computer 20 is used to control a steam catapult control 22 to provide a correct launch operation for the airplane being weighed. A sequence control 23 is used to provide a sequencing action to the motor 6 and the computer 20. The sequence control 23 may be manually operated, or it may be energized by a sensitive switch 24 mounted on the plate 1 which senses the presence of the plane 2.

In operation, the airplane to be weighed is driven on the plate 1 with the wheels contacting the gripping surfaces 3. The sequence control 23 is tripped to energize the motor 6 and the computer 20. The motor 6 rotates the cam 7 which accelerates the plane 2. The output signals from the cell 11 and accelerometer 15 are received by the computer 20 which computes the weight of the plane 2 and delivers the computed signal to the display 21 and the catapult control 22. The subsequent removal of the airplane 2 from the plate 1 deenergizes the sequence control 23 to prevent further operation of the motor 6 and computer 20 until another airplane is driven on the plate 1.

Accordingly, it may be seen that there has been provided, in accordance with the present invention, an automatic weigher for rapidly and accurately weighing large objects in a moving environment to provide a control signal for related apparatus without impeding the desired movement of the weighed objects.

What is claimed is:

1. An automatic weigher comprising drive means for supporting and accelerating an object to be weighed over a predetermined physical displacement, load cell means operative to measure the accelerating force supplied by said drive means, accelerometer means operative to measure the induced acceleration of said object, and computing means responsive to said load cell means and said accelerometer means to compute the inertial mass of said object to be weighed.

2. An automatic weigher comprising drive means for accelerating an object to be weighed over a predetermined physical displacement, said means including a movable support plate for said object, said plate having a high friction surface for temporarily gripping said object, motor means, cam means arranged to be driven by said motor means, and plate drive means responsive to said cam means and attached to said plate, an accelerometer attached to said plate drive means to measure an induced acceleration, a load cell arranged between said cam means and said plate drive means to measure an accelerating force applied to said plate, and a computer means responsive to said load cell and said accelerometer to compute the inertial mass of said object to be weighed according to the formula $M=F/A$, where $M=$ mass, $F=$ force and $A=$ acceleration.

3. An automatic weigher comprising drive means operative to accelerate an object to be weighed over a predetermined physical displacement in each of two opposing directions, load cell means connected between said drive means and an object to be weighed operative to measure the accelerating force supplied by said drive means in each of said two directions, accelerometer means operative to measure the induced acceleration of said object in each of said two directions and computing means responsive to said load means and said accelerometer means to compute the inertial mass of said object by averaging the computations for said two directions.

4. An automatic aircraft weigher comprising drive means operative to accelerate an aircraft to be weighed over a predetermined physical displacement, said means including a linearly movable support plate for said aircraft, said plate having a high friction surface for temporarily gripping the contacting wheel surfaces of said aircraft, motor means, cam means arranged to be driven by said motor means, and plate drive means responsive to said cam means and attached to said plate, an accelerometer attached to said plate means to measure an induced acceleration of said aircraft, a load cell arranged between said cam means and said plate drive means to measure an accelerating force applied to said plate and computer means responsive to said load cell and said accelerometer to compute the inertial mass of said aircraft according to the relationship $M=F/A$, where $M=$mass, $F=$force and $A=$acceleration.

5. An automatic aircraft weigher as set forth in claim 4 wherein said cam means is arranged to produce said displacement in each two opposing directions and said computer means is arranged to average the computations for said two directions.

6. An aircraft catapult control comprising drive means operative to accelerate an aircraft to be weighed over a predetermined physical displacement, said means including a linearly movable support plate for said aircraft, said plate having a high friction surface for temporarily gripping the contacting wheel surfaces of said aircraft, motor means, cam means arranged to be driven by said motor means, and plate drive means responsive to said cam means and attached to said plate, an acceleratometer attached to said plate means to measure an induced acceleration of said aircraft, a load cell arranged between said cam means and said plate drive means to measure an accelerating force applied to said plate, computer means responsive to said load cell and said accelerometer to compute the inertial mass of said aircraft according to the relationship $M=F/A$, where $M=$mass, $F=$force and $A=$acceleration and catapult control means responsive to a computed weight signal from said computer to adjust the energy supplied to a catapult in accordance therewith.

References Cited by the Examiner
UNITED STATES PATENTS

| | | | |
|---|---|---|---|
| 2,301,967 | 11/42 | Nosker et al. | 73—71.5 X |
| 2,305,783 | 12/42 | Heymann et al. | |
| 2,873,604 | 2/59 | Samsel | 73—67.1 |
| 2,955,460 | 10/60 | Stevens et al. | 73—71.6 |
| 3,070,996 | 1/63 | Schloss et al. | 73—67.1 |

RICHARD C. QUEISSER, *Primary Examiner.*

DAVID SCHONBERG, *Examiner.*